(12) United States Patent
Turner et al.

(10) Patent No.: US 6,639,378 B2
(45) Date of Patent: Oct. 28, 2003

(54) CURRENT CHOPPING IN SWITCHED RELUCTANCE DRIVE SYSTEMS

(75) Inventors: Michael James Turner, Leeds (GB); Charles Richard Elliott, Leeds (GB)

(73) Assignee: Switched Reluctance Drives Ltd., Harrogate (GB)

(*) Notice: Subject to any disclaimer, the term of this patent is extended or adjusted under 35 U.S.C. 154(b) by 20 days.

(21) Appl. No.: 09/992,866

(22) Filed: Nov. 19, 2001

(65) Prior Publication Data

US 2002/0063547 A1 May 30, 2002

(30) Foreign Application Priority Data

Nov. 24, 2000 (GB) ................................. 0028733

(51) Int. Cl.[7] .................................................. H02P 1/46
(52) U.S. Cl. ...................... 318/701; 318/808; 318/807; 318/139; 318/254; 318/599
(58) Field of Search ................. 318/808, 807, 318/139, 719, 439, 254, 798, 599, 684, 701; 388/920

(56) References Cited

U.S. PATENT DOCUMENTS

| | | | | |
|---|---|---|---|---|
| 4,366,531 A | * | 12/1982 | Karadsheh et al. | 363/57 |
| 4,459,535 A | * | 7/1984 | Schutten et al. | 318/808 |
| 4,933,621 A | | 6/1990 | MacMinn et al. | |
| 5,747,962 A | | 5/1998 | Fulton | |
| 5,852,356 A | * | 12/1998 | Levy et al. | 318/719 |

OTHER PUBLICATIONS

Stephenson, et al., "The Characteristics, Design and Applications of Switched Reluctance Motors and Drives," PCIM '93, Nürnberg, Germany, Conference & Exhibition, Jun. 21–24, 1993 pp. 1–68.

* cited by examiner

Primary Examiner—Karen Masih
(74) Attorney, Agent, or Firm—Dicke, Billig, & Czaja, PLLC

(57) ABSTRACT

A switched reluctance drive is supplied from a power source and has a DC link capacitor. The phases of the machine are controlled by a current chopping controller which, during phase conduction overlap, controls the initiation of chopping in a second phase so as to minimize the current drawn from the capacitor, thereby allowing a reduction in the capacitor rating.

20 Claims, 8 Drawing Sheets

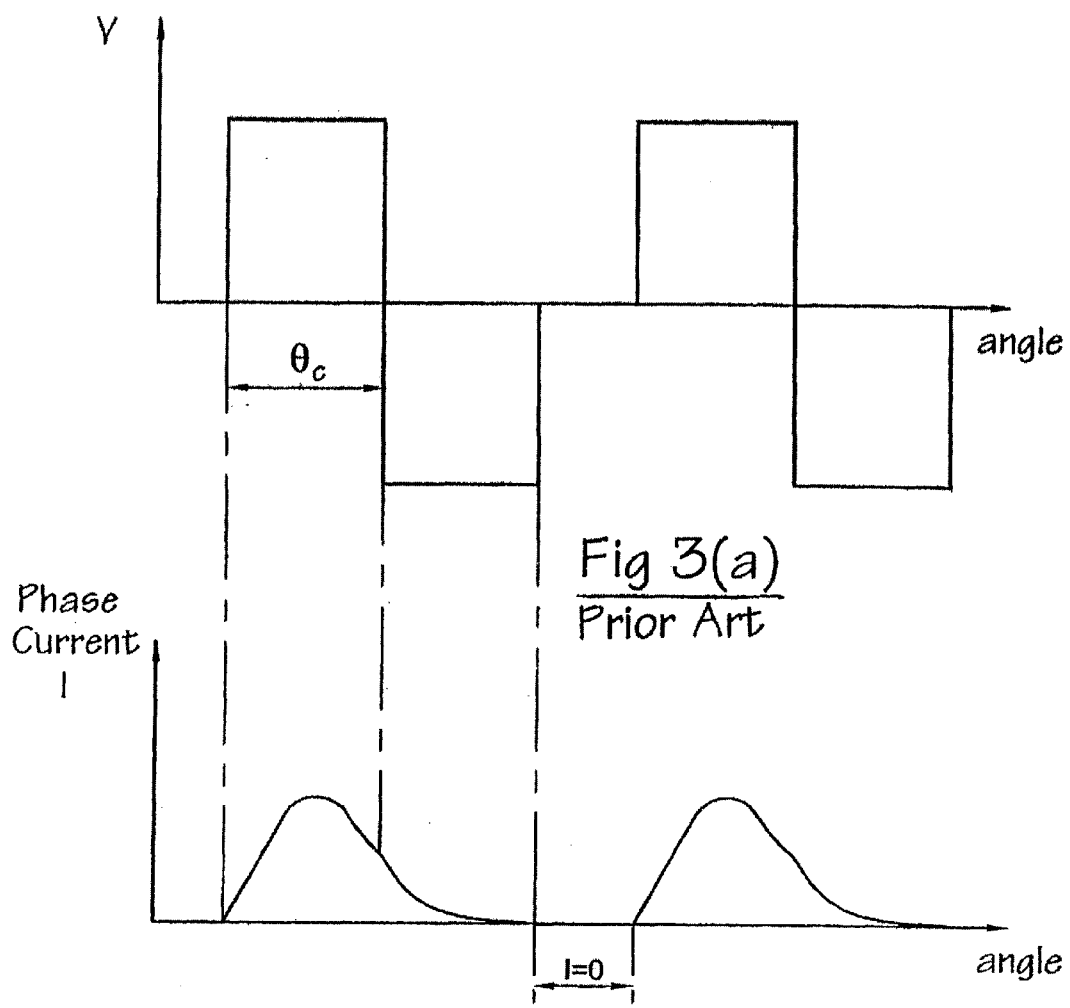
Fig 3(a)
Prior Art
Fig 3(b)
Prior Art
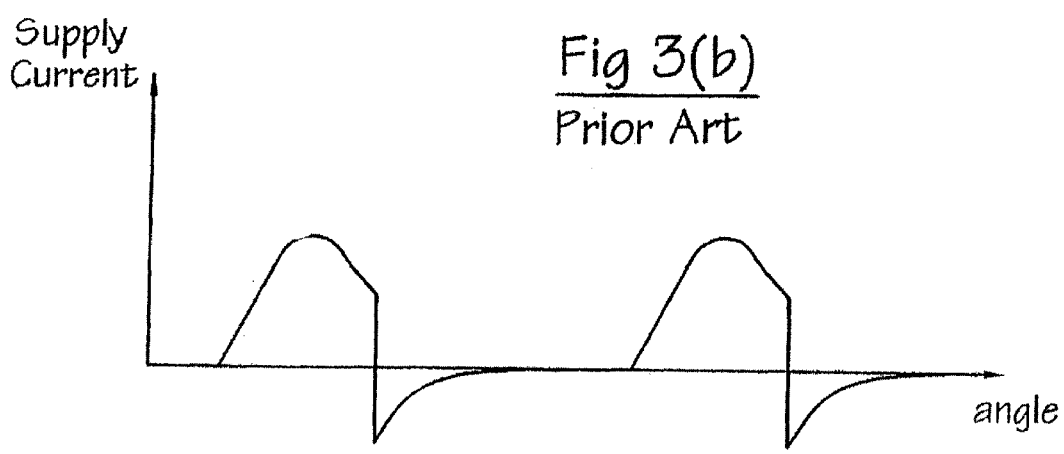
Fig 3(c)
Prior Art

CURRENT CHOPPING IN SWITCHED RELUCTANCE DRIVE SYSTEMS

CROSS-REFERENCE TO RELATED APPLICATION

The subject matter of this application is related to the subject matter of British Patent Application No. GB 0028733.4, priority to which is claimed under 35 U.S.C. §119 and which is incorporated herein by reference.

BACKGROUND OF THE INVENTION

1. Field of the Invention

This invention relates to switched reluctance drive systems. In particular, it relates to such systems where the controller is able to minimize the ripple current in the DC link capacitor.

2. Description of Related Art

The characteristics and operation of switched reluctance systems are well known in the art and are described in, for example, "The characteristics, design and application of switched reluctance motors and drives" by Stephenson and Blake, PCIM'93, Nürnberg, Jun. 21–24, 1993, incorporated herein by reference. FIG. 1 shows a typical polyphase switched reluctance drive in schematic form, where the switched reluctance motor 12 drives a load 19. The input DC power supply 11 can be, for example, a battery or rectified and filtered AC mains. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. A rotor position detector 15 is typically employed to supply signals corresponding to the angular position of the rotor. Its output may also be used to generate a speed feedback signal.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") that cannot be drawn from or returned to the supply. In practical terms, the capacitor 25 may comprise several capacitors connected in series and/or parallel, and where parallel connection is used some of the elements may be distributed throughout the converter. The cost and/or size of this capacitor can be important in installations which are sensitive to drive cost and/or the space occupied by the drive, for example in aerospace or automotive applications.

The switched reluctance drive is essentially a variable-speed system and is characterized by voltages and currents in the phase windings of the machine that are quite different from those found in traditional, sinusoidally fed, types of machines. As is well known, there are two basic modes of operation of switched reluctance systems: chopping mode and single-pulse mode, both of which are described in the Stephenson paper cited above. FIGS. 3(a)–3(c) illustrate single-pulse control, which is normally used for medium and high speeds in the speed range of a typical drive. FIG. 3(a) shows the voltage waveform typically applied by the controller to the phase winding. At a predetermined rotor angle, the voltage is applied by switching on the switches in the power converter 13 and applying constant voltage for a given angle $\theta_c$, the conduction angle. The current rises from zero, typically reaches a peak and falls slightly as shown in FIG. 3(b). When the angle $\theta_c$ has been traversed, the switches are opened and the action of energy return diodes places a negative voltage across the winding, causing the flux in the machine, and hence the current, to decay to zero. There is then typically a period of zero current until the cycle is repeated. It will be clear that the phase is drawing energy from the supply during $\theta_c$ and returning a smaller amount to the supply thereafter. FIG. 3(c) shows the current that has to be supplied to the phase winding by the power converter and the current that flows back to the converter during the period of energy return. Instead of opening both switches simultaneously, it is well known that there are advantages in opening one switch in advance of the other, allowing the current to circulate around the loop formed by the closed switch, the phase winding and one of the diodes. This is known as "freewheeling". It is used for various reasons, including peak current limitation and acoustic noise reduction.

At zero and low speeds, however, the single-pulse mode is not suitable, due to the high peak currents that would be experienced, and the chopping mode is used to actively control the phase winding current. There are two principal variants of the chopping mode. When the current reaches a predetermined level, the simplest method of chopping is to simultaneously open the two switches associated with a phase winding, e.g. switches 21 and 22 in FIG. 2. This causes energy to be returned from the machine to the DC link. This is sometimes known as "hard chopping". The alternative method is to open only one of the switches and allow freewheeling to occur. This is known as "freewheel chopping" or "soft chopping". In this mode of control, no energy is returned to the DC link from the phase winding, except at the end of the conduction period, when both switches are opened to finally extinguish the current.

With any chopping scheme, there is a choice of strategy for determining the current levels to be used. Many such strategies are known in the art. One commonly used scheme includes a hysteresis controller that enables chopping between upper and lower currents. A typical scheme is shown in FIG. 4(a) for hard chopping. At a chosen switch-on angle $\theta_{on}$ (which is often the position at which the phase has minimum inductance, but may be some other position), the voltage is applied to the phase winding and the phase current is allowed to rise until it reaches the upper hysteresis current $I_u$. At this point both switches are opened and the current falls until it reaches the lower current $I_l$ and the switches are closed again, repeating the chopping cycle. FIG. 5(a) shows the corresponding phase current waveform for a hysteresis controller using freewheeling. The reduction in chopping frequency is immediately evident.

It should be noted that if the machine is generating rather than motoring, the phase current may rise during freewheeling. Soft chopping can still be used by alternating the power circuit states between freewheeling (with one switch open) and energy return (with both switches open). The techniques described hereafter apply equally to motoring and generating modes of operation.

The supply currents flowing in the DC link due to the phase currents in FIGS. 4(a) and 5(a) are shown in FIGS.

4(b) and 5(b) respectively. In each case, the DC link capacitor supplies a proportion of the ac component of these waveforms. (Note that these figures are idealized, since the capacitor must have zero mean current and, in practice, the behavior of the currents in the presence of supply resistance, capacitor impedance and inductance is considerably more complex.) The capacitor current in the hard chopping case has both a higher frequency and a higher root mean square (rms) value. In the freewheeling case the current is reduced in both frequency and rms magnitude. The benefits of this with respect to capacitor rating are discussed in, for example, U.S. Pat. No. 4,933,621 (MacMinn), which is incorporated herein by reference.

While the hard and soft chopping modes have been described in the context of current control, it should be noted that they can also be used in conjunction with a voltage control system, where the average voltage applied to the phase winding is actively controlled. For example, a pulse width modulation (PWM) scheme may be applied to the switches 21 and 22, as is well known in the art.

The discussions so far have ignored the problem that occurs when the contributions of two or more phases are considered. Whenever two or more phases are operated together, the currents associated with the individual phases are added to give the total DC link current.

Two or more phases operating together can occur in many different systems. Although in 2-phase systems it is usual only to operate the phases alternately, U.S. Pat. No. 5,747,962, incorporated herein by reference and commonly assigned to the present assignee, discloses a method of operating both phases simultaneously over part of the electrical cycle of the machine. In 3-phase machines, it is possible to operate by exciting Phase A alone, then Phase B alone, then Phase C alone. However, to improve the torque output of the machine, advantage is often taken of the fact that the torque productive portions of each phase cycle overlap, so an excitation pattern of A, AB, B, BC, C, CA, A . . . is normally used. Similarly for 4-phase machines, there are normally always two phases producing torque in the required direction, so phases can be energized in pairs: AB, BC, CD, DA, AB . . . Corresponding rules apply for higher phase numbers, in which it is possible to use three or more phases for at least part of the electrical cycle.

When two or more phases are being used simultaneously, the effect on the capacitor current depends on the chopping control strategy adopted. Ideally, the energy returned by one phase at switch off should be channeled into an incoming second phase, but it is found that this is impossible to achieve with the normal hysteresis controller. For example, FIG. 4(a) and FIG. 5(a) show that neither the frequency nor the duty cycle of the chopping waveform are constant over the conduction angle, but vary as the inductance of the phase winding varies with rotor position. It is clear that it is not possible to achieve cancellation of the capacitor current whatever phase difference there is between the two currents with this type of controller.

The hysteresis controller is an example of the many "frequency wild" controllers which exist. These attempt to keep one parameter (here phase current) constant at the expense of the chopping frequency. A different type of chopping controller is a fixed frequency controller, in which the chopping frequency is kept notionally constant at the expense of, say, average phase current. A typical fixed frequency controller has a fixed (or at least controlled) frequency clock which triggers the closing of the switches in the power converter 13. One or both switches are opened when the phase current reaches its target value, allowing the current to fall until the switches are closed again in response to the clock signal. Controlling a second phase from the same clock is relatively simple but it will be clear that switching the two phases together has the immediate effect of approximately doubling the magnitude of the current excursions on the capacitor (depending on the duty cycle).

A typical chopping current waveform for a phase winding controlled by a peak current, fixed frequency controller is partly shown in FIG. 6(a). The phase winding is initially switched on by connecting it to the DC bus in the usual way. When the current reaches a pre-determined peak level, the controller switches the winding into freewheel or energy recovery mode, depending of the abilities of the power converter in use. (In FIG. 6(a), freewheeling is used for illustration.) The current falls at a rate determined by the voltage applied (if any), the rate of change of inductance of the phase winding, the voltage drop (iR) across the winding and the voltage drops across the diode(s) and switch. Assuming motoring operation, the current in the freewheeling interval will fall, as shown, and the current controller then triggers the reconnection of the phase winding to the DC link by closing the switch(es), forcing the current up again to the peak level, whereupon the cycle repeats. As will be seen, the frequency of the switching is now constant, while the current excursions from the peak may change from one end of the excitation block to the other. The period of the switching frequency is marked as T in FIG. 6(a), and the duty of the cycle is defined as the ratio of on time to the duration of the period.

FIG. 6(b) shows the supply current for one phase winding and FIG. 6(c) the supply current for a second phase. If the switch-on points of both phases are simultaneous, the supply currents will add to give a peak equal to $2*I_{pk}$ and the corresponding capacitor ripple current at the chopping frequency will be high.

It is known specifically for 4-phase systems having two phases always energized together to use a single clock signal with a unity mark: space ratio and to initiate the turn-on of one phase from the rising edges, and the other phase from the falling edges, of the clock signal. This interleaves the two phase currents in a fixed manner and results in some reduction of capacitor ripple current. It is not completely successful, however, in that, as the duty cycle of one phase changes relative to the other, the capacitor current increases. The interleaving of the phase currents is fixed and cannot cope with such variations. This requires an increase in the rating of the capacitor, resulting in increased cost and/or size. In addition, the energy loss in the capacitor can represent a significant fraction of the overall energy loss in some systems, particularly low-voltage, high-current systems, leading to a noticeable reduction in efficiency of the drive.

There is, therefore, a need for a solution to the problem of minimizing capacitor ripple current for a system with any number of phases and any pattern of excitation in which two or more phases can be excited coincidentally.

SUMMARY OF THE INVENTION

In one particular form, the invention includes dynamically tuning the switching of the incoming phase winding of a switched reluctance machine so as to minimize the capacitor current. This is done by dynamically selecting the phase angle of the chopping clock of the incoming phase with respect to the phase already chopping. The invention can be implemented in a number of ways, which broadly fall into the two categories of open-loop and closed-loop implementations.

The chopping waveforms arising from the excitation of two phases simultaneously can be used to minimize the current ripple by setting a phase shift between the chopping clock signals that control the two phases.

The setting of the phase shift can be preset or it may be dynamic open loop or closed loop. If it is variable under open or closed loop control, the value of the phase shift can be based on a parameter of the machine. For example, a demand and speed can be used for open loop control. For closed loop control, a signal representative of the current ripple itself can be used to derive a value of phase shift that will minimize the capacitor current ripple.

BRIEF DESCRIPTION OF THE DRAWINGS

The invention can be put into practice in various ways, several embodiments of which will now be described by way of example with reference to the accompanying drawings, in which:

FIGS. 3(a)–3(c) show the waveforms of voltage, phase current and capacitor current for the known single-pulse mode of operation;

DETAILED DESCRIPTION OF PREFERRED EMBODIMENTS

Figure 1:
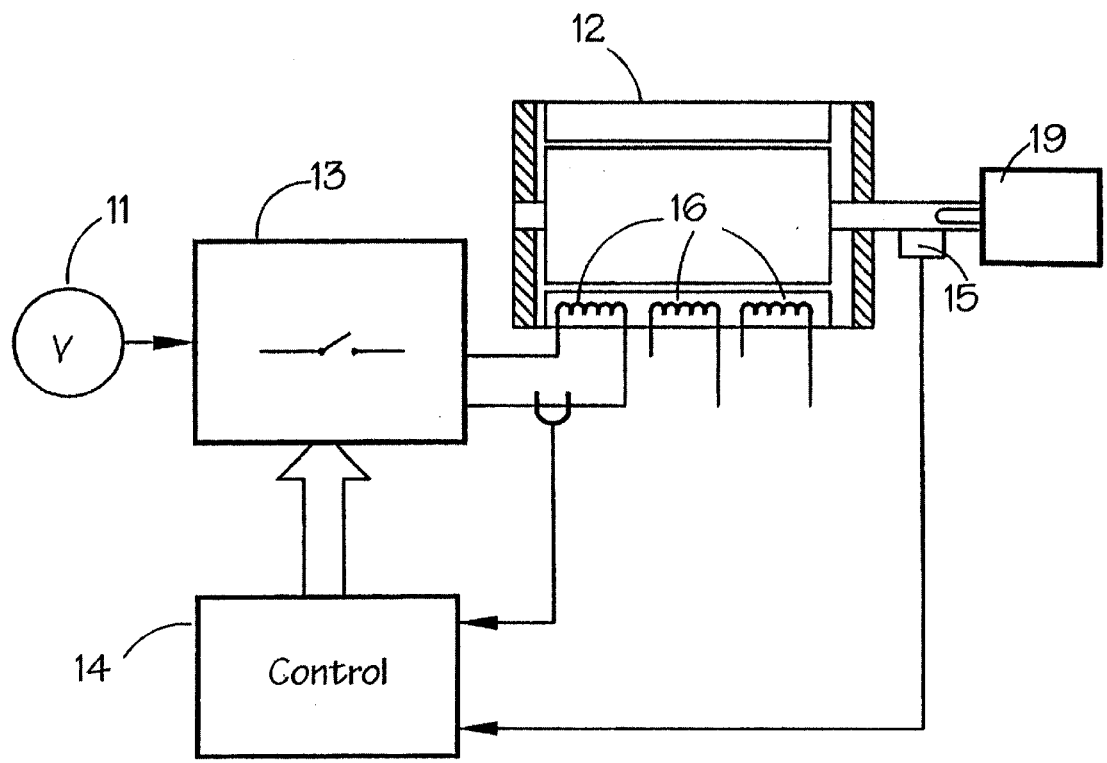
FIG. 1 shows a schematic diagram of a known switched reluctance system.
Figure 2:
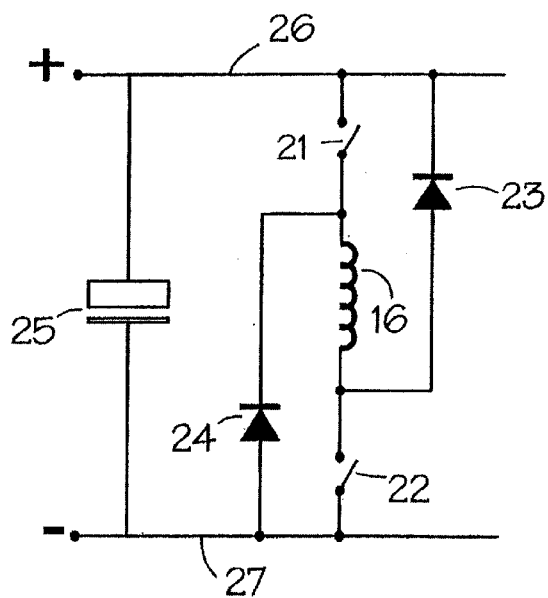
FIG. 2 shows the connection of one phase winding to the power converter.
Figure 4A:
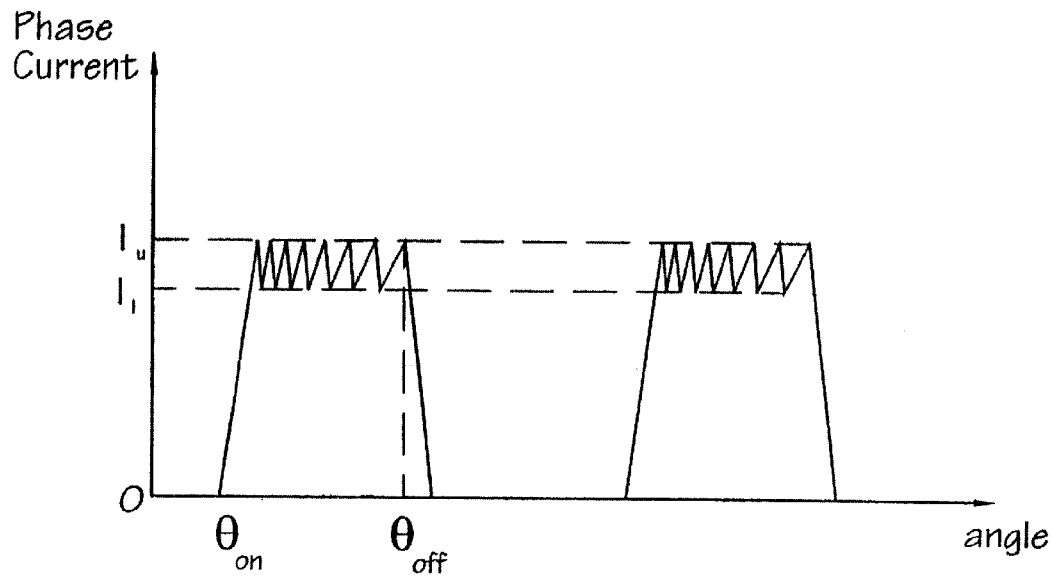
FIGS. 4(a)–4(b) show the phase current and supply current waveforms for the known hard chopping mode of operation.
Figure 4B:
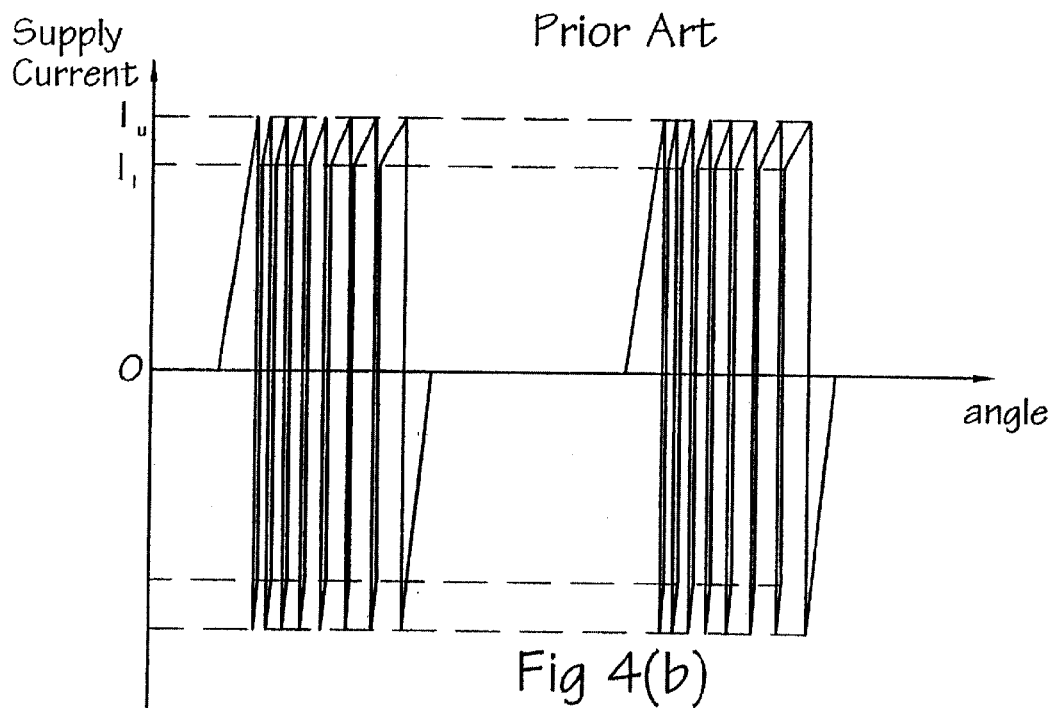
Figure 5A:
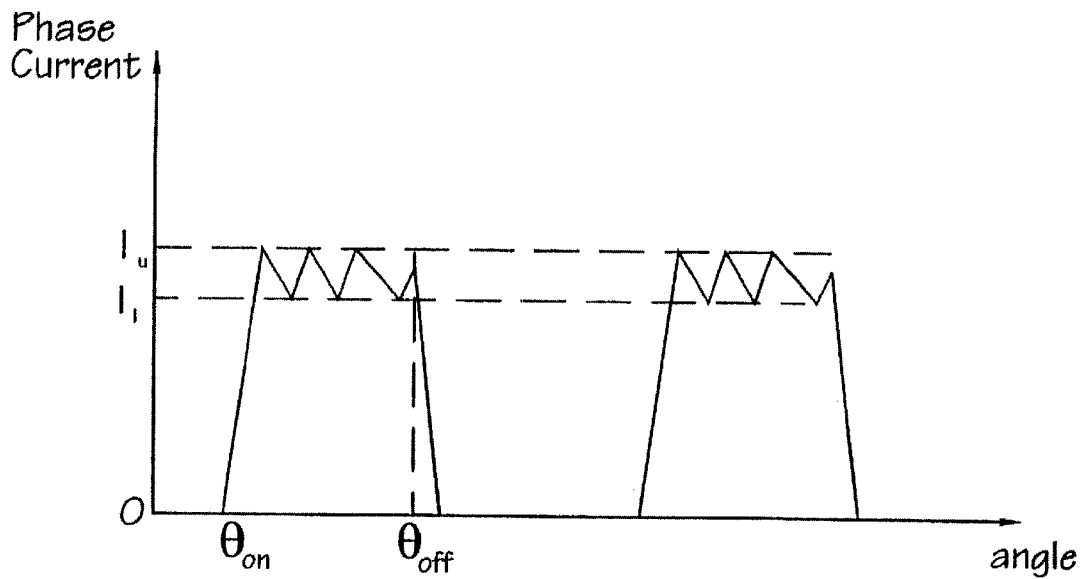
FIGS. 5(a)–5(b) show the phase current and supply current waveforms for the known freewheel chopping mode of operation.
Figure 5B:
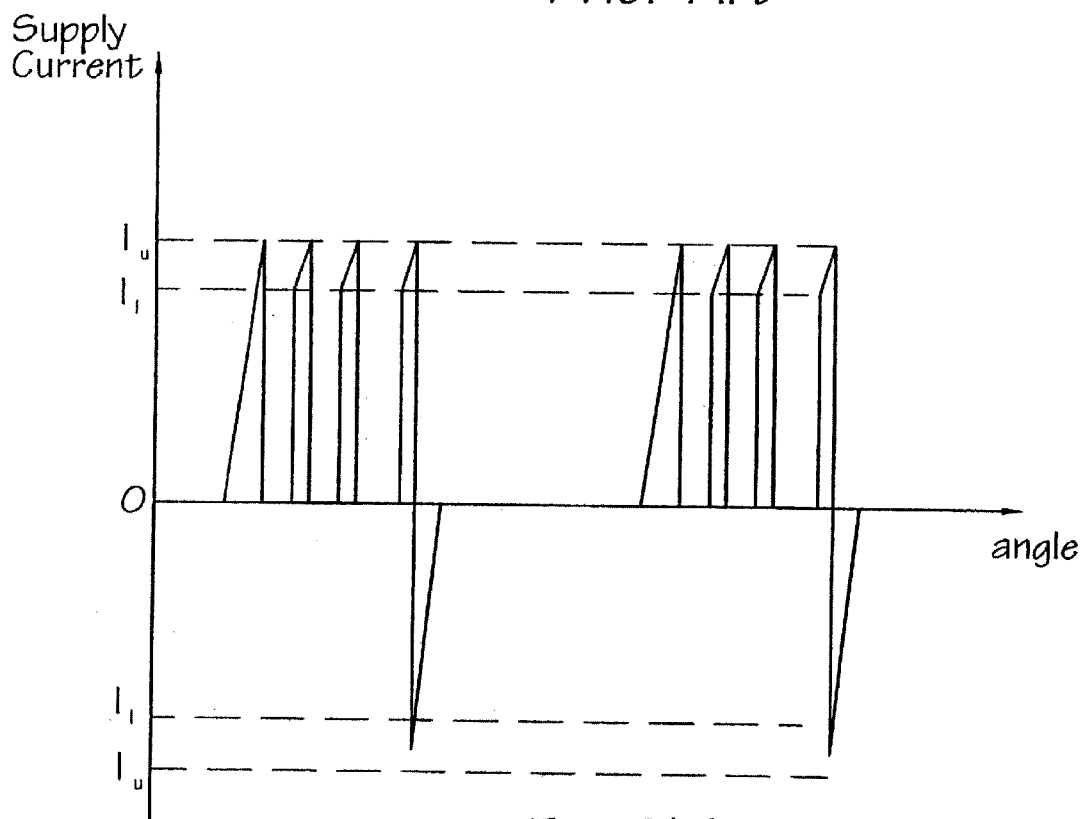
Figure 6A:
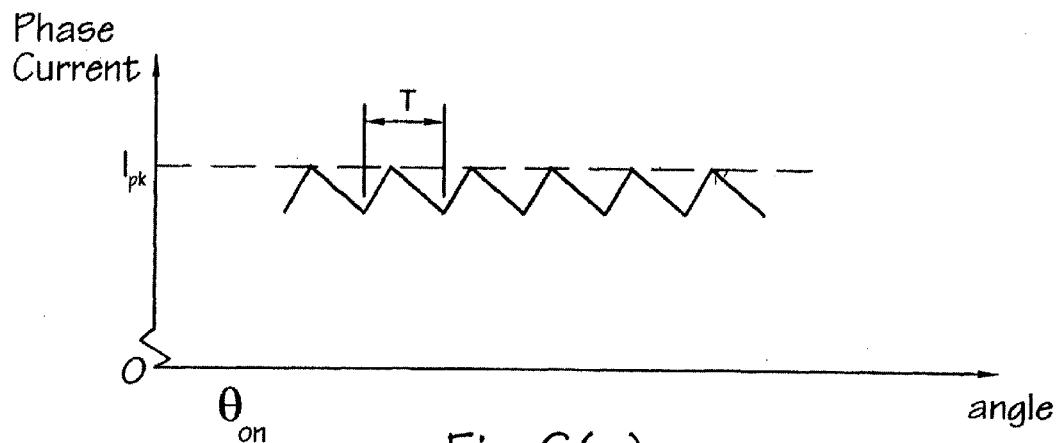
FIGS. 6(a)–6(c) show the waveforms of phase and supply currents associated with a fixed frequency current controller.
Figure 6B:
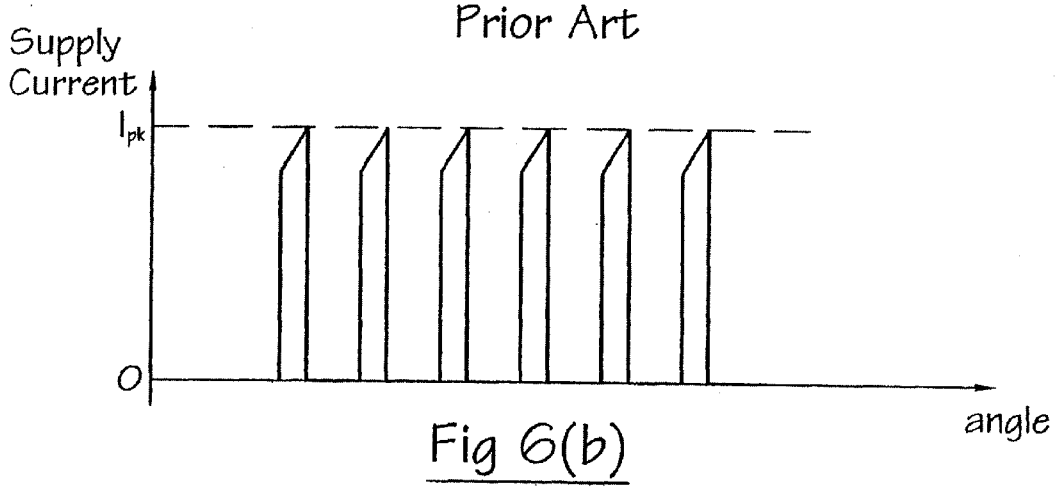
Figure 6C:
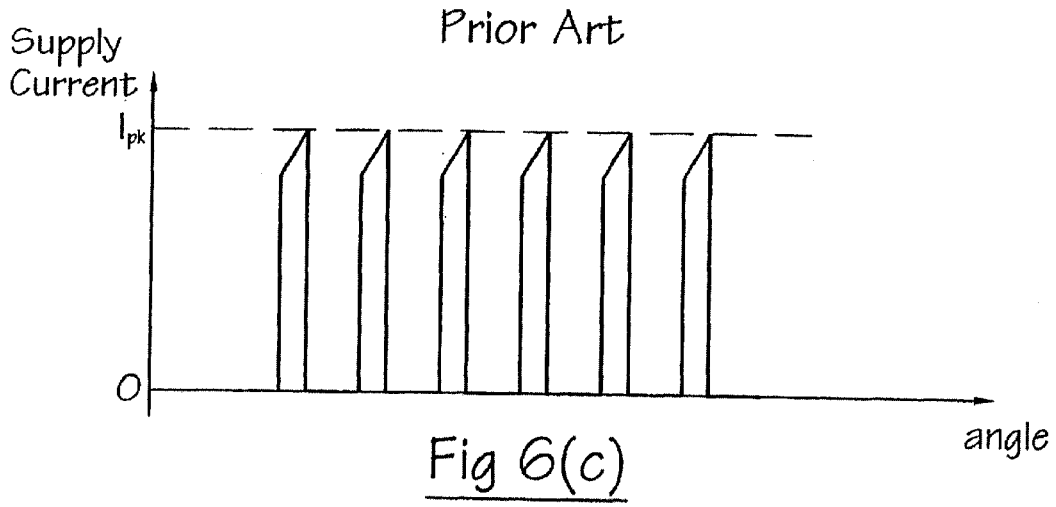
Figure 7A:
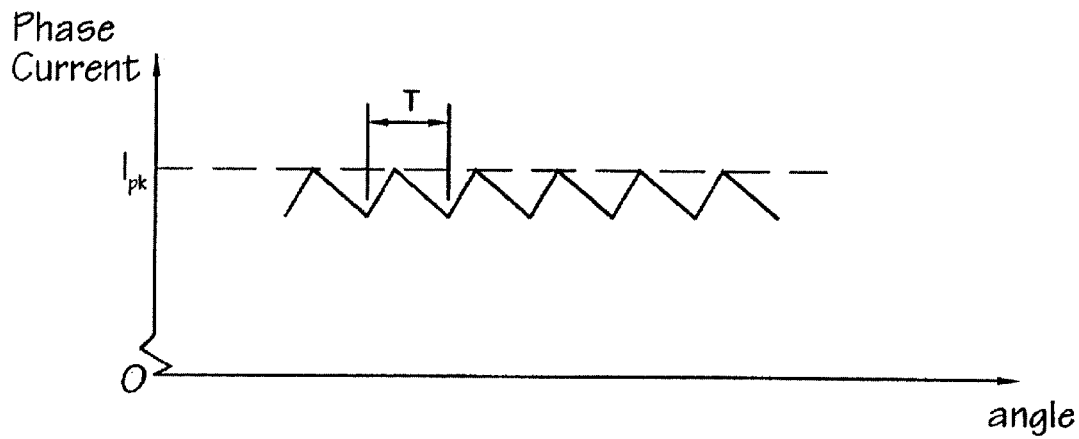
FIGS. 7(a)–7(c) show the waveforms of phase and supply currents associated with a fixed frequency current controller operated according to one aspect of the invention.
Figure 7B:
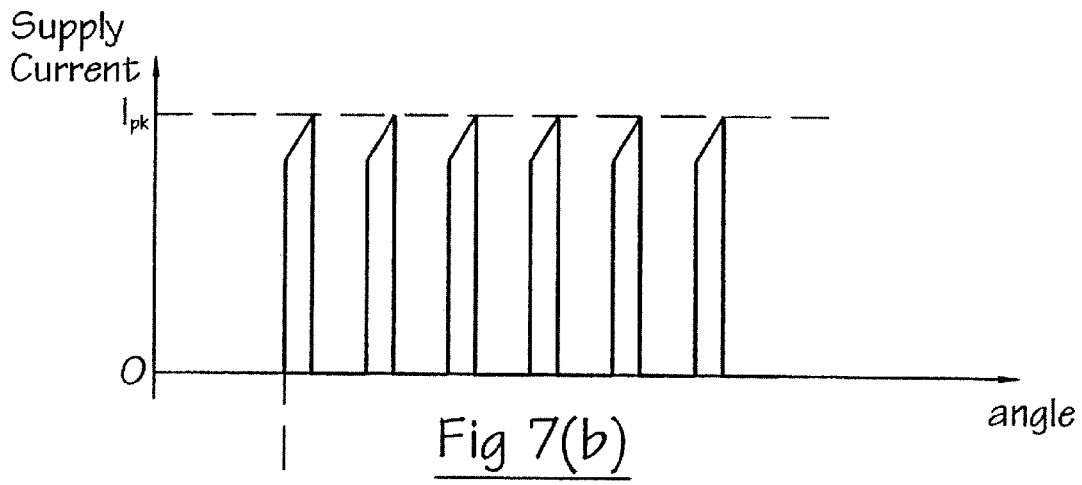
Figure 7C:
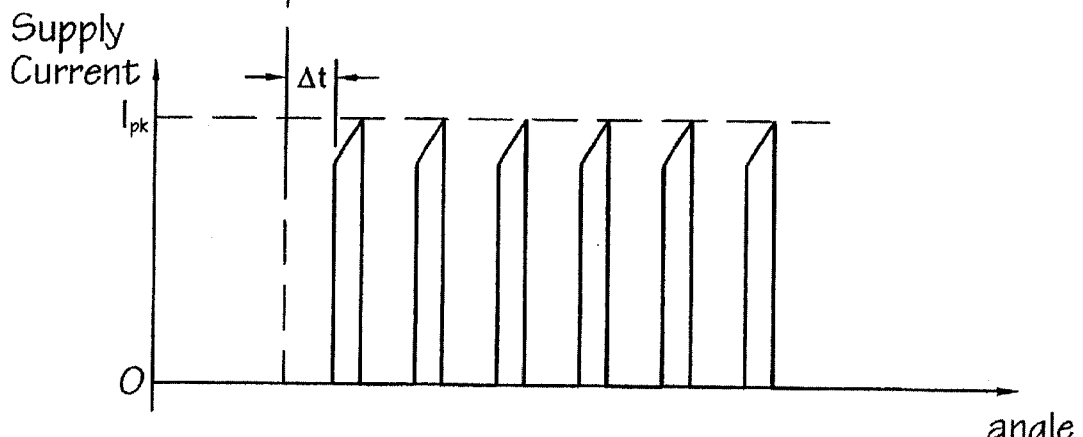

The first group of illustrated embodiments of the invention use an open-loop technique for reducing capacitor current ripple. FIGS. 7(a)–7(c) show the same waveforms as FIGS. 6(a)–6(c), but in which the phase of the current in the second phase winding is selected relative to the first phase. The phase difference is defined by a time $\Delta t$, as shown. By inspection of FIGS. 7(b) and 7(c) it will be seen that the variation of the position of the second current waveform relative to the first (i.e. the delay $\Delta t$) serves to vary the way in which the two phase currents combine. It will be clear that, when $\Delta t$ is zero or the period of the chopping waveform T, the addition of the two phase currents will give rise to maximum ripple current. Thus, at some intermediate value of $\Delta t$, there will be a minimum value of capacitor ripple current. It therefore follows that the system can be 'tuned' to minimize the capacitor rating.

Note that if the frequency of the chopping clock is varied (for example, in a pseudorandom way to reduce acoustic noise), then the period $\Delta t$ will also have to vary in an appropriate manner. Alternatively, the delay could be defined as a fixed phase angle, which would automatically translate into the correct value of $\Delta t$.

For example, in a 3-phase system (ABC) using an excitation sequence A, AB, B, BC . . . , the tuning could lie in triggering the incoming phase at a predetermined time $\Delta t$ before or after the previous trigger for the phase already chopping. In this case, Phase B could be triggered $\Delta t$ after A to minimize the capacitor current ripple. At the appropriate rotor angle, excitation of Phase A would cease and Phase B would continue alone. When, at a further rotor angle, Phase C is introduced, a phase shift of zero relative to the chopping clock is used (giving an effective phase shift of $-\Delta t$ relative to Phase B). Once excitation in Phase B has been completed and Phase C has been excited alone, Phase A is re-introduced at a phase angle of $\Delta t$ relative to Phase C, which is also $\Delta t$ relative to its previous position with respect to the chopping clock.

Figure 8:
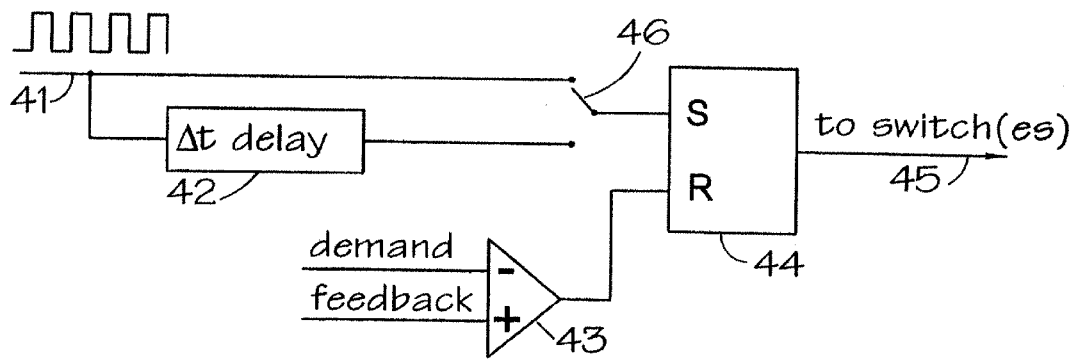
FIG. 8 shows a diagram of a circuit that can implement one embodiment of the invention.

FIG. 8 shows a controller according to an embodiment of the invention. A signal representing the chopping clock is shown on line 41. This signal is also passed through block 42, which adds a delay of $\Delta t$. The switch 46 is toggled by the control system to select the appropriate signal to be fed to the SET input of flip-flop 44. The RESET input is fed from comparator 43, which determines whether the current demand is higher or lower than the actual current in the phase winding. The output of the flip-flop on line 45 is used, along with the conventional angle commutation information, to trigger the switch or switches for one phase winding in the power converter. It will be appreciated that the circuit shown in FIG. 8 would be replicated for each of the other phases in the drive system.

It will be appreciated that a special case of this arrangement is $\Delta t=T/2$ (where T is the period of the chopping clock), i.e. when the phase delay is 180°. In this case, a clock signal with a unity mark:space ratio could be used and each incoming phase driven off the next of the rising or falling edges. This produces interleaving of currents, as will now be described. If the chopping sequence starts off with Phase A being controlled from the rising edges of the clock, the incoming Phase B must be controlled from the falling edges. When the rotor advances to the position where Phase C is energized, it must be controlled from the rising edges, to interleave correctly with Phase B. When Phase A is next required, it must be controlled from the falling edges (whereas it was previously controlled from the rising edges).

Figure 9:
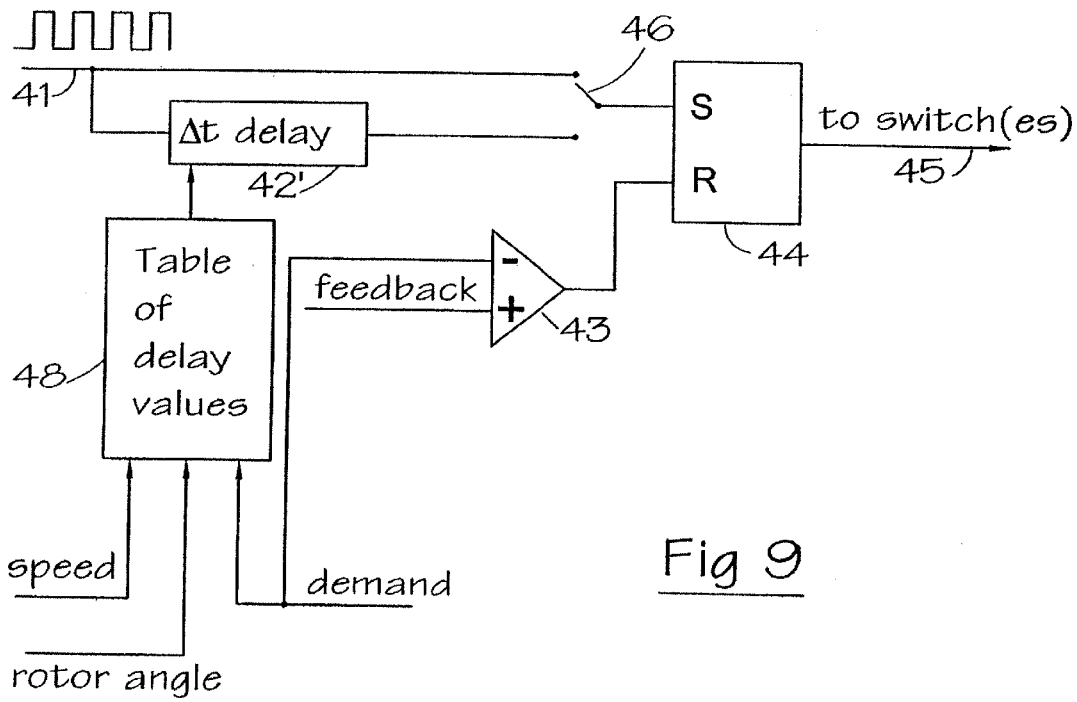
FIG. 9 shows another circuit that can implement one embodiment of the invention.

Another open-loop method uses a variable value of $\Delta t$, so that the capacitor current ripple is minimized for a variety of load points, speeds, torques, currents, etc. These values of $\Delta t$ are determined either by design and simulation, using a model of the machine that is sufficiently accurate to calculate capacitor currents reliably or by empirical measurement during initial testing of the drive. The values are characterized as a function of, for example, speed and/or load and/or rotor angle and stored in a look-up table in the same way in which switch-on and switch-off angles are stored. The appropriate value can be read out of the table at the start of the chopping period for the phase winding or at some other time suitable to the control system. This embodiment is particularly suited to a digital control system. One circuit that implements this technique is shown in FIG. 9, where the table 48 holds appropriate values of $\Delta t$ and is indexed by the demanded current and/or rotor angle and/or speed. Apart from this the circuit of FIG. 9 is the same as that in FIG. 8 and like reference numerals have been used for like parts. The speed signal to the look-up table 48 may be derived in a variety of ways known in the art, such as from the output of the rotor position sensor as referred to above.

Figure 10:
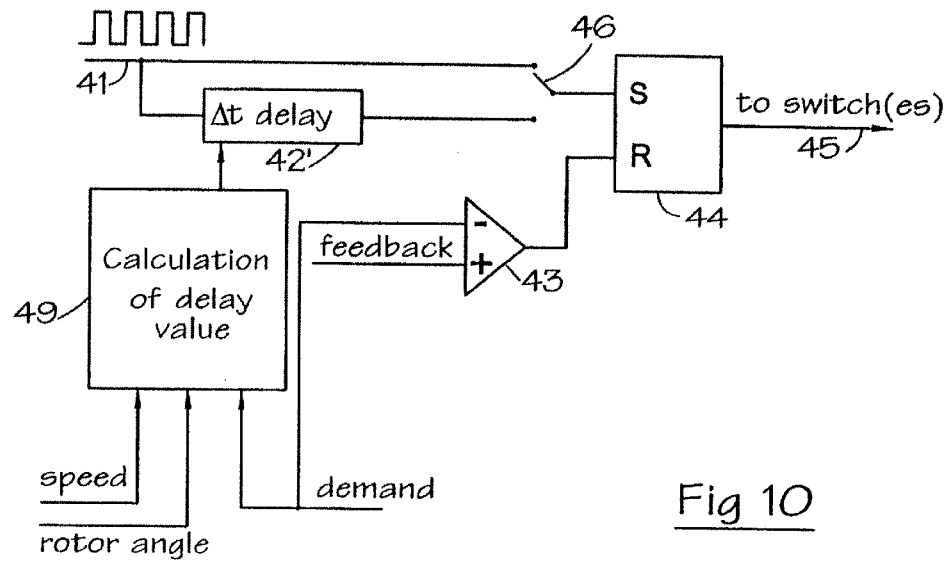
FIG. 10 shows a yet further circuit that can implement one embodiment of the invention.

A further open-loop method is to calculate the appropriate value of Δt each time chopping begins in the phase winding. This can be achieved by a circuit such as that illustrated in FIG. 10. In this particular illustration, the calculating block 49 has as its inputs values of current demand and/or speed demand and/or rotor angle and gives an output of Δt. This embodiment is appropriate to both analog control circuits and microprocessor-based systems. The circuit of FIG. 10 is the same as that in FIG. 9 except for replacement of the look-up table 48 with the calculating block 49. Otherwise, like reference numerals have been used for like parts.

FIG. 10 shows the calculation block 49 as having inputs of speed, rotor position and current demand. Other parameters or variables can be used. For example, it is known that the magnitude of current ripple in the capacitor is a function of the magnitudes and duty cycles of the currents in the active phases and the phase angles between them. It is therefore possible to use inputs of current magnitude and calculated or measured duty cycle to find the value of Δt that will minimize the capacitor ripple current. This alternative embodiment of the invention would therefore use inputs of phase current magnitudes and duty cycles to the calculation block 49 to produce the appropriate value of Δt.

The open-loop embodiments described above produce useful reductions in capacitor current ripple. Changes in interleaved waveforms during a conduction period can be accommodated in embodiments of the invention that use closed-loop control to select the optimum value of Δt dynamically and hence further minimize the capacitor current ripple. The minimization can be carried out according to one of a number of known minimization functions. This is a development of the open-loop systems described above because, regardless of the disparity between the duty cycles of the two phases, the minimization function will find the phase angle for which the ripple current is a minimum. This has a further advantage in that no prior characterization or storage of data is required. A control loop is introduced having a fixed demand of zero capacitor current ripple, a signal indicative of the actual capacitor current ripple and a suitable filter so that only the chopping frequency components of capacitor current influence the controller. (There will also be low-frequency components in the capacitor currents due, for example, to rectifier ripple from the supply and/or the fundamental phase-to-phase switching in the SR machine.) Various ways of providing the necessary feedback will now be described.

Figure 11:
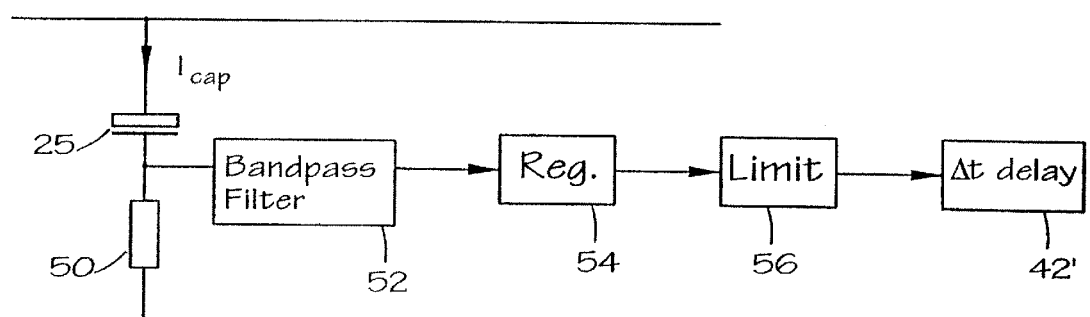
FIG. 11 shows a circuit for providing feedback of capacitor current.

FIG. 11 shows a system with a current measuring shunt 50 in series with the DC link capacitor 25. The voltage across the shunt is fed through a bandpass filter 52 to produce a signal indicative of capacitor ripple current. The characteristic of the ripple current in the dc capacitor is essentially that of a rectangular wave having the most of its energy concentrated in the fundamental chopping frequency and first few harmonics. The width of the bandpass is a compromise between addressing the range of frequencies at which ripple energy occurs in the dc link capacitor and rejecting noise due to a bandpass that is too wide. By limiting the band to an appropriate number of harmonics of the ripple current the greatest part of the effect can be achieved without passing excessive noise energy as well.

The output of the bandpass filter 52 is supplied to a control regulator 54. This regulator can take several forms, as will be evident to those familiar with control systems. In its simplest form it can be a proportional controller with carefully chosen fixed gain. A better solution is to use a minimizing controller that will actively search for the minimum value of ripple as the value of Δt varies. In general terms, it is unlikely that zero ripple will be achieved for all values of current and duty cycle, but the minimizing controller will seek the conditions which give minimum steady state error.

The output of the regulator 54 is passed to a limit block 56. It is important that Δt is never greater than the period of the clock cycle T. It may also be important that a slew limit is placed on Δt so that stability is maintained in the control loop. Both of these constraints can be implemented by the limit block 56. The output of the limit block 56 is the input to the block 42', in place of the calculation block 49 of FIG. 10.

Figure 12:
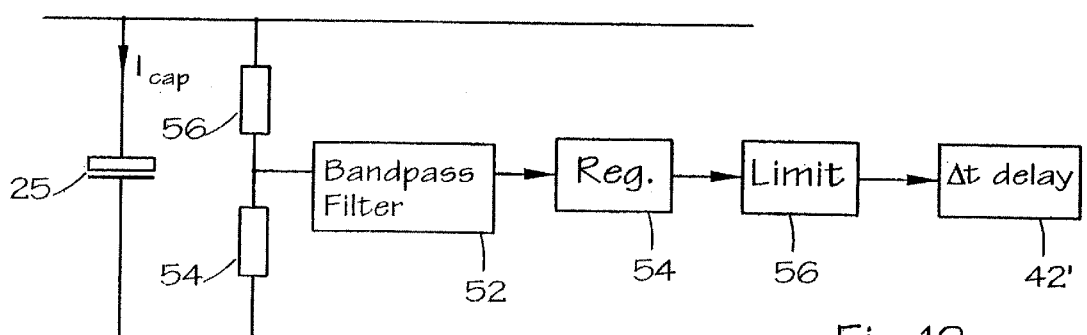
FIG. 12 shows an alternative circuit for providing feedback of capacitor current.

FIG. 12 shows a resistive divider across the DC link which deduces the capacitor current by using the relationship i=C dv/dt. In this case, the bandpass filter is similarly arranged to pass components at the chopping frequency and a few harmonics above. Again, the regulator 54 and the limiter 56 are used to produce a control signal for the variable delay 42' in FIG. 10. Other means of measuring the capacitor ripple current could be used, for example a Hall-effect current sensor or an AC current transformer. If the electrical impedance of the capacitor 25 were known, it would be possible to estimate the ripple current by measuring the voltage ripple across the capacitor and using the relationship $$I = V_{ripple}/2\pi f_{ripple} C$$

where $f_{ripple}$ is the ripple frequency and C is the capacitance in Farads.

Another method of providing the feedback signal is to make use of the fact that the power converter will typically have transducers in place to measure the individual phase winding currents. With knowledge of the switch states (also available in the power converter) then it is possible to work out whether the current in the phase winding is contributing to current out of the capacitor (switches on) or into the capacitor (switches off). This can be used effectively to "reconstruct" salient parts of the capacitor waveform and provide a signal to the current ripple reducing controller. The particular advantages of this method are that fewer components are needed in the power circuits and that the resulting waveform is derived from relatively high-grade current transducers and should have little noise in it, particularly any low-frequency components arising from the rectifier and basic phase switching. This implementation may be best suited to a microprocessor-based or ASIC-based system with fast digital computation ability.

While the above illustrative embodiments have been described with reference to the motoring mode of operation, it will be appreciated that the invention is equally applicable to the generating mode of operation and brings the equivalent reductions in capacitor current ripple.

The skilled person will appreciate that variation of the disclosed arrangements are possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the spirit and scope of the following claims.

What is claimed is:

1. A controller for a polyphase switched reluctance machine supplied with supply current from a voltage bus having a DC link capacitor connected across the voltage bus, the controller comprising:

means for producing first and second unidirectional chopping currents from the supply current for energizing first and second phases of the machine in sequence according to a demand input; and means for phase shifting the second chopping current for the second phase with respect to the first chopping current for the first phase when excitation of the two phases is coincident, whereby current ripple in the DC link capacitor is reduced.

2. A controller as claimed in claim 1, further including, for the second phase, means for producing a clock signal output, and delay means for producing a delayed clock signal output, the chopping current for the second phase being derived from one of the clock signal output and the delayed clock signal output, the controller further comprising selector means arranged to select between the clock signal output and the delayed clock signal output for deriving the phase shifted chopping current for the second phase.

3. A controller as claimed in claim 2, including look-up means for storing values of delay for variations in one or more monitored parameters of the machine, the controller being operable to vary phase shift according to an output from the look-up means corresponding to a delay value based on the monitored parameter(s) to set the phase shift of the second chopping current relative to the first chopping current.

4. A controller as claimed in claim 2, including calculation means for establishing a delay value from one or more monitored parameters of the machine, the calculation means being operable to output the delay value to the delay means to set the phase shift of the delayed chopping current.

5. A controller as claimed in claim 3, in which the one or more monitored parameters of the machine are selected from the group comprising current ripple in the DC link, demand current, phase current magnitude, phase current duty cycle, rotor angle and machine speed.

6. A controller as claimed in claim 5, including a regulator arranged to produce a control output for countering the current ripple from the monitored parameter, the controller being variable according to the output of the regulator to set the phase shift of the chopping current for the second phase to reduce the current ripple in the DC link.

7. A controller as claimed in claim 6, in which the monitored parameter is current ripple in the DC link, the controller further including a bandpass filter for producing a current ripple signal from the current ripple in the DC link for the regulator.

8. A controller as claimed in claim 6, in which the regulator produces a proportional control output.

9. A controller as claimed in claim 6, further including a limiter for limiting the control output to a predetermined maximum of phase shift of the second chopping current.

10. A switched reluctance drive system for controlling a switched reluctance machine supplied with supply current from a voltage bus having a DC link capacitor connected across the voltage bus, the system including a controller, comprising:

a switched reluctance machine;

means for producing first and second unidirectional chopping currents from the supply current for energizing first and second phases of the machine in sequence according to a demand input; and means for phase shifting the second chopping current for the second phase with respect to the first chopping current for the first phase when excitation of the two phases is coincident, whereby current ripple in the DC link capacitor is reduced.

11. A method of reducing current ripple in a DC link supplying current to a polyphase switched reluctance machine, said DC link comprising a voltage bus and a DC link capacitor connected across the voltage bus, the method comprising:

producing first and second unidirectional chopping currents from the supply current for energizing first and second phases of the machine in sequence according to a demand input; and phase shifting the second chopping current for the second phase with respect to that for the first phase when excitation of the two phases is coincident, whereby current ripple in the DC link capacitor is reduced.

12. A method as claimed in claim 11, including storing values of delay associated with at least one monitored parameter of the machine; and setting the phase shift of the second chopping current according to the stored value of the delay.

13. A method as claimed in claim 11, including calculating a phase shift value from at least one monitored parameter of the machine; and setting the phase shift of the second chopping current according to the calculated value.

14. A method as claimed in claim 12, in which the at least one monitored parameter of the machine is selected from the group comprising current ripple in the DC link, demand current, phase current magnitude, phase current duty cycle, rotor angle or machine speed.

15. A method as claimed in claim 14, in which the monitored parameter is current ripple in the DC link, the method further including:

producing a control output from the monitored parameter for countering the current ripple; and varying the phase shift of the second chopping current according to the control output to minimize the current ripple in the DC link capacitor.

16. A method as claimed in claim 14, in which the monitored parameter is current ripple in the DC link, and in which a signal indicative of the current ripple is bandpass filtered.

17. A controller for a polyphase switched reluctance machine, comprising:

means for producing first and second chopping signals for energizing first and second phases of the machine in sequence according to a demand input; and means for phase shifting the second chopping signal for the second phase with respect to the first chopping signal for the first phase when excitation of the two phases is coincident;

wherein the controller further includes, for one of the phases, means for producing clock signal output, delay means for producing delayed clock signal output, and selector means, the chopping signal for the one phase being derived from the clock signal output and being switchable between the clock signal output and the delayed clock signal output, the selector means being arranged to select between the clock signal output and the delayed clock signal output for phase shifting the chopping signal for the one phase.

18. A method of reducing current ripple in a dc link of a polyphase switched reluctance drive, the method comprising:

producing first and second chopping signals for energizing first and second phases of an electrical machine in sequence according to a demand input; and phase shifting the second chopping signal for the second phase with respect to that for the first phase when excitation of the two phases is coincident;

wherein the phase shifting is performed by selecting between the at least first and second chopping signals for one of the phases when excitation of the two phases is coincident.

19. A method of reducing current ripple in a dc link of a polyphase switched reluctance drive, the method comprising:

producing first and second chopping signals for energizing first and second phases of an electrical machine in sequence according to a demand input;

phase shifting the second chopping signal for the second phase with respect to that for the first phase when excitation of the two phases is coincident;

storing values of delay associated with at least one monitored parameter of the drive; and setting the phase shift of the second chopping signal according to the stored value of the delay.

20. A method of reducing current ripple in a dc link of a polyphase switched reluctance drive, the method comprising:

producing first and second chopping signals for energizing first and second phases of an electrical machine in sequence according to a demand input;

phase shifting the second chopping signal for the second phase with respect to that for the first phase when excitation of the two phases is coincident;

calculating a phase shift value from at least one monitored parameter of the drive; and setting the phase shift of the second chopping signal according to the calculated value.

* * * * *